US005717032A

United States Patent [19]

Kim et al.

[11] Patent Number: 5,717,032

[45] Date of Patent: Feb. 10, 1998

[54] FILMING COMPOSITE FOR CATHODE RAY TUBE

[75] Inventors: Hyeon-sang Kim; Jong-ho Oh, both of Suwon, Rep. of Korea

[73] Assignee: Samsung Display Devices Co., Ltd., Kyungki-do, Rep. of Korea

[21] Appl. No.: 401,981

[22] Filed: Mar. 10, 1995

[30] Foreign Application Priority Data

Oct. 25, 1994 [KR] Rep. of Korea ........................ 94-27272

[51] Int. Cl.[6] ........................ C08L 67/02

[52] U.S. Cl. ........................ 525/165; 525/166; 525/168; 525/174; 522/104; 522/106; 522/107; 522/113; 428/423.7; 428/424.4

[58] Field of Search ........................ 525/165, 166, 525/168, 174; 522/104, 106, 107, 113; 428/423.7, 424.4

[56] References Cited

U.S. PATENT DOCUMENTS

| | | | |
|---|---|---|---|
| 4,659,654 | 4/1987 | Metoki et al. | 430/564 |
| 5,344,353 | 9/1994 | Jang et al. | 445/45 |

*Primary Examiner*—Nathan M. Nutter
*Assistant Examiner*—Duc Truong
*Attorney, Agent, or Firm*—Leydig, Voit & Mayer

[57] ABSTRACT

A filming composition comprises an acryl emulsion having a molecular weight of 1.5~2.5 million and a decomposition starting temperature of 200°~250° C., as a main component. The composition has a tendency to decompose at low temperature and can be completely decomposed and removed during frit sealing, without the need for separate baking or complex equipment. A screen having good characteristics can be obtained through an advantageous method.

7 Claims, 1 Drawing Sheet

FILMING COMPOSITE FOR CATHODE RAY TUBE

BACKGROUND OF THE INVENTION

The present invention relates to a filming composition for a cathode ray tube and a method for manufacturing a screen using the same, and particularly to a filming composition for a filming layer formed as an interlayer between a phosphor layer and a deposited metal layer, and a screen manufacturing method using the same.

The screen structure for a conventional cathode ray tube (CRT), and the manufacturing method therefor, will be briefly described with reference to FIG. 1.

A CRT screen is manufactured through the processes of forming a black matrix layer 2 on the inner surface of a panel 1, foxing a phosphor layer 3 using a photoresist on the black matrix layer 2 by photolithography, forming a filming layer 4 as an interlayer by coating or spraying a filming composition on the phosphor layer 3, and depositing a metal to form a metal layer 5. The interlayer, i.e., filming layer 4, is later removed through a high-temperature heating process.

When electrons emitted from an electron gun stimulate the phosphor particles in the phosphor layer, light is emitted in all directions, and particularly, both forward and rearward of the panel. At this time, the deposited metal layer 5, usually consisting of aluminum, reflects the rearward-emitted light back toward the front, to enhance the luminance at the front side of the screen. Here, if the metal is deposited directly on the phosphor layer so that metal becomes injected between the phosphor particles, the metal layer is not formed as a uniform and flat reflection layer. This reduces the forward-reflecting effect and the emission luminance is not sufficiently enhanced. To solve this problem, an organic layer (namely, a filming layer) is formed on the phosphor layer by coating, spraying, etc. A metal deposited layer is formed on the filming layer and the organic material is removed by heating to a temperature of decomposition of the organic layer, to thereby form a flat metal layer spaced apart at a prescribed distance from the phosphor layer.

The method for manufacturing the filming layer between the phosphor layer and the metal layer is classified as an aqueous acryl emulsion method or an oily lacquer method.

In the aqueous method, the filming composition is composed of polyvinyl alcohol, acryl emulsion, etc. as the major components, glycerin as a wetting agent and ammonium hydroxide, hydrogen peroxide, etc. to prevent swelling of the metal layer during baking. By this method, after forming the metal layer, baking is needed at a temperature range of about 400°~450° C. to decompose and remove the organic materials in the phosphor layer and the filming layer. However, since frit sealing at 400°~450° C. should be carried out afterward to seal the panel and funnel, the layer is ultimately baked twice.

The molecular weight of the acryl emulsion used as the major component in the conventional filming composition (B-74 of Rohm & Haas Co.) is about four million, and decomposition begins at a temperature of about 300° C. Accordingly, if the frit sealing is carried out without the separate baking for decomposing the organic material, the decomposition of the organic material in the filming layer occurs too late and a residual gas of the organic material remains, even at temperatures of 400°~450° C. (the upper temperature limit for frit sealing, where softening and crystallization of the frit would begin). This precludes complete sealing. Moreover, the organic material which has not completely decomposed and the gas remaining in the cathode ray tube deteriorate the lifetime, luminance and characteristics of the cathode ray tube. Therefore, the separate baking process to decompose and remove the organic material cannot be omitted.

The following method, however, has been used to eliminate the separate baking. That is, an exhaust pipe is installed at the neck portion of the funnel during frit sealing and oxygen is supplied to help the decomposition of the organic material. The position of the exhaust pipe 8 during the frit sealing 6 of the panel 1 and the funnel 7 is illustrated in FIG. 2. Even though the separate baking process to decompose and remove the organic material including the filming layer can be eliminated in this manner, the complications of inserting the exhaust pipe into the neck portion during the sealing render this method impractical.

On the other hand, in the oily lacquer method, acryl resin is dissolved in a solvent such as toluene, ethyl acetate, methyl ethyl ketone, etc., and the thus-obtained composition is sprayed to form a thin filming layer by surface tension with water. Through this method, since a flat interlayer can be obtained with a small amount of organic material, the separate baking to remove the organic material can be omitted. However, the solvents are explosive and thus special equipment is needed to carry out the procedure. Further, the process is complicated and careful supervision is necessary.

SUMMARY OF THE INVENTION

An object of the present invention is to provide an aqueous filming composition for an interlayer (filming layer) of a screen for a cathode ray tube, enabling a simple and safe manufacturing process for CRT screen.

Another object of the present invention is to provide a simplified method for manufacturing a screen for a cathode ray tube, using the above filming composition.

To accomplish the object, there is provided a filming composition for forming a filming layer as an interlayer for forming a metal layer of a screen for a cathode ray tube, comprising an acryl emulsion having a molecular weight of 1.5~2.5 million and a decomposition starting temperature of 200°~250° C. as a main component thereof.

The other object of the present invention is accomplished by a method for manufacturing a screen comprising the steps of forming a phosphor layer on the inner surface of the panel where a black matrix layer is formed, forming a filming layer by coating and drying a filming composition comprising an acryl emulsion having a molecular weight of 1.5~2.5 million and a decomposition starting temperature of 200°~250° C. as a main component, on the phosphor layer, and forming a metal layer on the filming layer.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

The acryl emulsion is preferably made of a copolymer of MMA (methyl metacrylate), BMA (butyl methacrylate), EA (ethyl acrylate) and MAA (methyl acrylic acid). The amount of the acryl emulsion is preferably 5~30 wt % as a solid content based on the total amount of the composition.

The acryl emulsion used as a main component in the filming composition in the present invention has a decomposition starting temperature of 210° C. which is about 90° C. lower than that of the conventional acryl emulsion. Therefore, the decomposition and removal of the acryl emulsion is easily accomplished so that the baking process carried out after the formation of the metal layer can be omitted. That is, the filming layer can be completely decomposed and removed, without leaving a residual gas or ash resulting from incomplete combustion, at the softening/crystallization temperature of the frit applied when sealing the panel and funnel.

Figure 1:
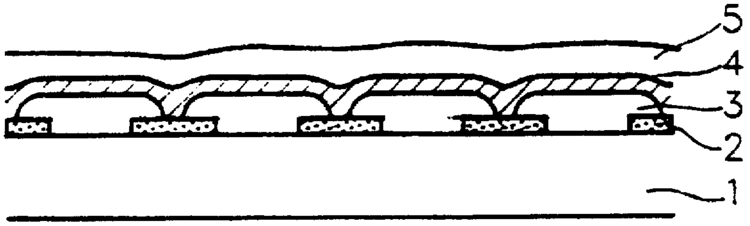
FIG. 1 illustrates a schematic structure of the screen of the conventional cathode ray tube.
Figure 2:
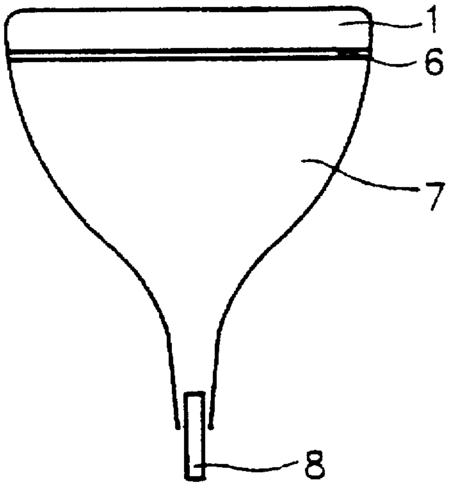
FIG. 2 shows the position of the exhaust pipe when sealing a panel and a funnel.
Figure 3:
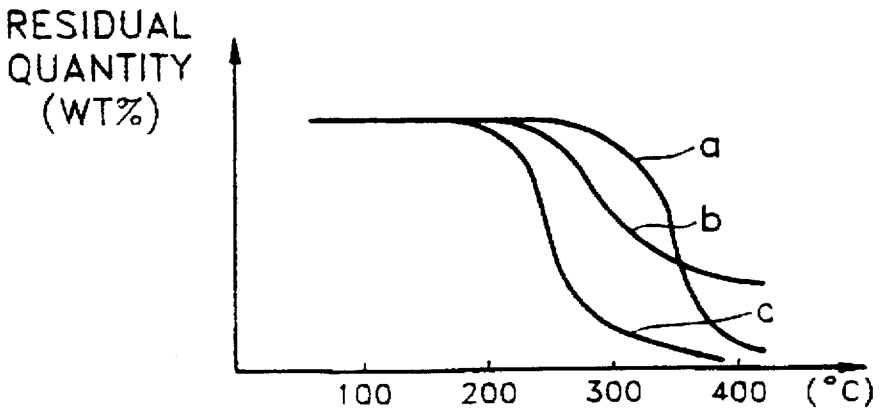
FIG. 3 is a graph showing the heat decomposition characteristic according to the component of each filming composition.

FIG. 3 is a graph showing the heat decomposition characteristic according to the component of various filming compositions. In this graph, plot "a" corresponds to the conventional acryl emulsion B-74 (Rohm & Haas Co.), plot "b" corresponds to the polyvinyl alcohol which is the major component of the conventional filming composition, and plot "c" corresponds to ECA (Rohm a Haas Co.), as an example of the acryl emulsion used as a main component in the filming composition of the present invention. From this figure, it is shown that the acryl emulsion used in the present invention has a lower decomposition temperature than both the conventional acryl emulsion and polyvinyl alcohol.

In the filming composition of the present invention, a viscosity increasing agent such as polyacryl solution is preferably included instead of polyvinyl alcohol which has a high decomposition temperature. The amount of this agent added ranges from 0.01~2.0 wt % as a solid content based on the total amount of the composition.

If the viscosity increasing agent is added to the filming composition, the viscosity of the composition is maintained at a high level. The applicability of the composition is increased, and since the surface thereof is coarse after coating, the swelling of the metal layer during decomposition of the organic material by heat can be prevented.

The viscosity increasing agent may be optionally added. However, if the viscosity increasing agent is not added, the viscosity of the filming composition is too low and the surface of the subsequently formed inter layer becomes too smooth. If the metal is deposited on this overly smooth layer, pin holes are not formed in the metal layer and the metal swelling phenomena might be induced due to gas which could not escape during decomposition of the organic material. Therefore, if the viscosity increasing agent is not added, it is preferred that a small amount of an aqueous ammonium oxalate ($(NH_4)_2C_2O_4.H_2O$) is sprayed after forming the coating of the filming composition in order to form pin holes in the subsequently formed metal layer.

The viscosity increasing agent and aqueous ammonium oxalate can also be used simultaneously.

The embodiments of the present invention will be described in detail below. In the embodiments, separate baking for decomposing organic material is eliminated after forming the metal layer. Since the results for screen manufactured by using filming compositions including each component having the upper and lower limit values are illustrated to obtain a preferred range of the amount of each component, sometimes undesirable results are obtained from some embodiments. However, these also are included in the scope of the present invention. Further, the present invention is not limited to the embodiments described below. The comparative examples are provided to compare the luminance of the screen manufactured by each example.

COMPARATIVE EXAMPLE 1

35 wt % of acryl emulsion, 20 wt % of polyvinyl alcohol, a small amount of ammonium oxalate and the residual quantity of water were mixed and stirred. 2% aqueous ammonium chloride solution was added to adjust the pH of the solution to six, to prepare the conventional filming composition.

The filming composition was coated on the phosphor layer and dried to form a filming layer. An aluminum deposited layer was formed on the filming layer. The layer was baked at about 450° C. to decompose and remove organic material. Then, frit sealing was carried out afterward. The luminance of the thus obtained screen was assumed to be 100%.

EXAMPLE 1

5 wt % as a solid content of aqueous 38.9% ECA (Rohm & Haas Co., Japan) solution and 95 wt % of pure water were mixed and stirred. Ammonium hydroxide was added to the solution to adjust the pH of the solution to eight, to form the filming composition according to the present invention. A black matrix layer and a phosphor layer were formed on the panel and then a coating of the filming composition was applied and dried. Aluminum was deposited on the obtained filming layer to form an aluminum deposited layer.

The separate baking process was omitted and the organic material in the filming layer was decomposed and removed during frit sealing of the panel and funnel.

The organic material was completely removed during sealing and the frit sealing was good. However, since the viscosity of the filming layer was low, some aluminum swelling emerged. The luminance according to this example was 75%.

EXAMPLES 2~4

Filming compositions were prepared according to the same method as described in Example 1, except that the amount as a solid content of aqueous 38.9% ECA solution was 15 wt %, the amount of pure water was 85 wt %, and the pH was adjusted to four (Example 2), six (Example 3) and nine (Example 4), respectively.

The filming layer and aluminum deposited layer were formed and frit sealing was carried out according to the same method as described in example 1

The status after frit sealing was good, but some aluminum swelling still developed. The screen manufactured by using the filming composition prepared by adjusting the pH to nine showed the highest luminance. This means that a weak alkaline composition gives a screen having good characteristics.

Screen luminance was 80% (Example 2), 90% (Example 3) and 100% (Example 4), respectively. The present inventor confirmed that the aluminum swelling phenomenon can be eliminated by forming the filming layer, spraying a small amount of aqueous ammonium oxalate and forming an aluminum layer thereon.

EXAMPLE 5

The filming composition was prepared according to the same method as described in Example 1, except that the amount of the aqueous 38.9% ECA solution was 30 wt % as a solid content, and the amount of pure water was 70%.

The filming layer and the aluminum deposited layer were formed and frit sealing was carried out.

After frit sealing, the sealing status was somewhat poor with some cracking. Aluminum swelling was also observed.

EXAMPLES 6~8

The filming composition was prepared by the same method as described in Example 2, except that 0.01 wt % (Example 6), 0.2 wt % (Example 7) and 2.0 wt % (Example 8) of viscosity increasing agent G110 (Rohm & Haas) was added as a solid content, and the pH of the composition was adjusted to eight.

The filming layer and the aluminum deposited layer were formed and frit sealing was carried out.

In the case of manufacturing the filming composition by adding 0.01 wt % of the viscosity increasing agent, the viscosity of the filming composition was about 2 cps, which indicates a weak viscosity increasing effect. Therefore, it is known that, after frit sealing, the aluminum swelling phenomenon is not significantly improved. When using 2.0 wt % of the viscosity increasing agent, the viscosity of the filming composition is increased too much (to about 10 cps) and the application characteristic of the filming composition was not satisfactory. Also, the uniformity of the filming layer was reduced, and accordingly, the luminance of the formed screen was somewhat lowered.

The best results, such as good applicability, high luminance (105%), good frit sealing and no aluminum swelling, were obtained when 0.2 wt % of the viscosity increasing agent was used.

Here, screen luminance was 95% (Example 6), 105% (Example 7) and 80% (Example 9), respectively.

The component ratio of the raw materials, the pH of the filming composition, and screen luminance in each example are illustrated in table 1.

TABLE 1

| composition amount (wt %) and results | Examples 1 | 2 | 3 | 4 | 5 | 6 | 7 | 8 |
|---|---|---|---|---|---|---|---|---|
| ECA | 5 | | 15 | | 30 | | 15 | |
| pure water | 95 | | 85 | | 70 | | residual quantity | |
| G110 | — | | — | | — | 0.01 | 0.2 | 2.0 |
| pH | 8 | 4 | 6 | 9 | 8 | | 8 | |
| luminance (%) | 75 | 80 | 90 | 100 | — | 95 | 105 | 80 |

From the examples, it is shown that when the filming composition of the present invention includes 15 wt % of acryl emulsion in a solid content and has weak alkalinity, good effects can be obtained. Further, when the viscosity increasing agent and/or ammonium oxalate is added, the flatness of the metal layer is improved and the swelling of the aluminum layer is reduced to give good effects.

The method for manufacturing a screen using the filming composition of the present invention has certain advantages when is compared with the method using the conventional composition, as follows.

First, when the method according to the present invention is compared with the conventional method using an aqueous filming composition, the separate baking to decompose and remove the filming layer can be eliminated and so the total time can be reduced by at least two hours or above. Moreover, since the baking furnace is not needed, the cost can be greatly reduced.

When the method according to the present invention is compared with the conventional method using an oily composition, the separate baking can also be eliminated. However, the dangerous solvents (considered to be the worst aspect in the lacquer method) are not used and so expensive equipment is not needed. Also, there is a broad range of yield results of the composition prepared by the lacquer method, according to ambient conditions (e.g., temperature, humidity, etc). However, since the composition prepared by the method of the present invention is insensitive to ambient conditions, the yield for the composition of the present invention is more consistent. Moreover, since the process is simplified, process management is advantageous and equipment costs are reduced by approximately 99%.

As described above, the problems induced in the conventional methods using the aqueous or oily composition can be solved by the method using the filming composition according to the present invention, so that a screen having good characteristics can be manufactured through an advantageous method.

What is claimed is:

1. A filming composition for forming an interlayer for forming a metal layer of a screen of a cathode ray tube, the filming composition comprising an acryl emulsion that is a copolymer of methyl methacrylate, butyl methacrylate, ethyl acrylate, and methyl acrylic acid, having a molecular weight of 1.5~2.5 million and a temperature at which decomposition starts of 200°~250° C., as a main component.

2. The filming composition as claimed in claim 1, wherein the acryl emulsion is 5.0~30 wt % as a solid based on total weight of the filming composition.

3. The filming composition as claimed in claim 1, wherein the filming composition has a weak alkaline pH.

4. The filming composition as claimed in claim 1, comprising a viscosity increasing agent.

5. The filming composition as claimed in claim 4, wherein the viscosity increasing agent is a polyacryl solution that is 0.01~2.0 wt % as a solid based on the total weight of the filming composition.

6. The filming composition as claimed in claim 3 wherein the filming composition has a pH of about 8.

7. The filming composition as claimed in claim 5 wherein the viscosity increasing agent content is about 0.2 wt %.

* * * * *